C. A. R. GRAAMANS.
GALVANIC CELL.
APPLICATION FILED JULY 25, 1917.

1,340,222.

Patented May 18, 1920.
2 SHEETS—SHEET 1.

C. A. R. GRAAMANS.
GALVANIC CELL.
APPLICATION FILED JULY 25, 1917.

1,340,222.

Patented May 18, 1920.
2 SHEETS—SHEET 2.

UNITED STATES PATENT OFFICE.

CHRISTIAAN ANTONIE RUDOLPH GRAAMANS, OF ROTTERDAM, NETHERLANDS, ASSIGNOR TO SYNDICAAT GRAAMANS' PATENT, OF ROTTERDAM, NETHERLANDS.

GALVANIC CELL.

1,340,222.   Specification of Letters Patent.   Patented May 18, 1920.

Application filed July 25, 1917. Serial No. 182,787.

*To all whom it may concern:*

Be it known that I, CHRISTIAAN ANTONIE RUDOLF GRAAMANS, a subject of the Queen of the Netherlands, and residing at 154 Havenstraat, Rotterdam, the Netherlands, have invented certain new and useful Improvements in Galvanic Cells, of which the following is a specification.

This invention relates to "wet" and "dry" galvanic cells of the kind in which the positive pole is constituted by a carbon rod surrounded by a depolarizing substance, adapted to absorb the gases formed at the pole. Among these cells, the cell of Leclanché and its modifications occupy a very prominent position, and it is in particular to such cells that the invention is especially applicable.

The present invention primarily consists in the provision of a cell which is simpler in construction and more practical than the wellknown cells and in which the disadvantages of the latter are avoided.

In the wet Leclanché cells, the porous jar has been rendered superfluous by compressing a mixture of manganese dioxid with the carbon into one self contained mass or block. In these cells the combined pole and depolarizing substance after ceasing to work properly have to be replaced by a new one, which adds to the cost of the cell. In order to eliminate this disadvantage the use of renewable granular manganese dioxid in combination with a renewable detachable rod was returned to, while porous jar was replaced by a small linen bag tied up around the top end of the carbon rod. The cell thus obtained is universally used notwithstanding the drawbacks connected with the same.

These drawbacks consist in repeated fractures of the carbon rods during transport. Consequently considerable time and effort is expended in packing the cells, and this results in a considerable packing cost. The rods must be fixed into the bags during transport and as a large part of the rods project from the latter the exposed parts are not supported. After the bags have been filled and tied up around the carbon rods the superfluous part of the bags projecting beyond the tying string is cut off whereby the carbon rod is used as a support. As the exposed portion of the rod is not protected the smooth hard surface of the rod is damaged and in practice it has been shown, that thereby the rod loses a considerable part of its resistance, so that same becomes liable to getting broken.

The existing dry cells have the disadvantage that when ceasing to work they are entirely valueless and must be thrown away, such cells besides requiring very careful packing.

In the cell according to the invention, not only the above mentioned drawbacks have been eliminated, but the wet and dry cells constructed in accordance with the invention are composed in principle of the same parts, so that in manufacture standardization can be carried out to a much further extent than was possible with the old cell constructions.

The principal feature of the cell according to the invention consists in the provision of a simplified electrode with depolarizer, said electrode being adapted for use in wet as well as in dry cells.

Further features and characteristics of the invention may be described hereinafter with reference to the accompanying drawings.

Figure 3:
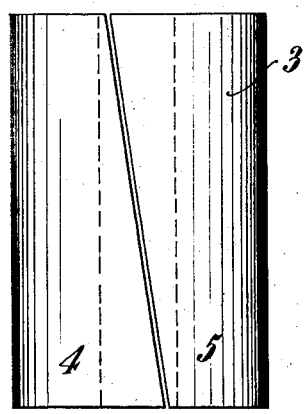
Fig. 3 represents an elevation and Fig. 4 a plan view of a cylinder block of the electrode, composed of two halves.

The electrode illustrated in the drawing comprises a carbon rod 1 to the end of which a terminal 2 is fitted. The carbon rod is of circular cross section and is of the same shape as the rods generally in use in cells to which this invention may be applied. Said rod is inserted into a cylinder block 3, constructed of a compressed mixture of manganese dioxid with coke and coal as used in Leclanché's cells. As appears clearly from Fig. 3 this block is split into two halves 4 and 5 along a plane placed under an angle to the axis of said block. This peculiar way of splitting has for its object to simplify assembling of the parts. The cylinder is inclosed in a wrapper 6 of linen or some other suitable material. The parts of the cylinder may be wrapped into said material in the operative position, or the wrapper may be made before-hand in the shape of a bag or sleeve into which the parts of the cylinder may be inserted. This last operation is exceedingly simplified by splitting the cylinder along a plane situated under an angle to the axes of the cylinder, as mentioned above. Besides, this latter construction results in a better electrical contact being obtained between the parts of the block and the carbon rod, as will be clear from the further description.

The cylinder shape of block is the most appropriate, but the block may be made of other shapes if desired.

The bore in the block 3 is of approximately the same width as the thickness of the rod 1, so that the parts having been assembled, the rod fits slidable in the bore, making a good electrical contact with the block material. In order to prevent dislocation of the parts 4 and 5 in the direction of the axis end plates 7 and 8 are fitted to both ends of the block 3. These end plates which are of insulating material project beyond the periphery of the cylinder and are provided with dovetailed recesses 9. They are most conveniently drawn against the cylinder by means of a string or some other tieing material slung in a regular pitch on the circumference of the end plates through said recesses and tied up so as to draw the end plates toward each other. This way of connecting has the advantage that around the block a network is woven while, if the parts of which the block is composed are shaped in accordance with Fig. 3, said parts are drawn tight around the rod. This construction is improved by forming the recesses 9 so that their bases 11 lie within the circumference of the block. Practice has shown that the best results and a regular and tight network are obtained with end plates having seven recesses 9 each. It is evident that the number of recesses can be varied without departing from the spirit of the invention. The string may also be slung through the end plates so as to be tied up in the direction of the axis of the block.

Figure 6:
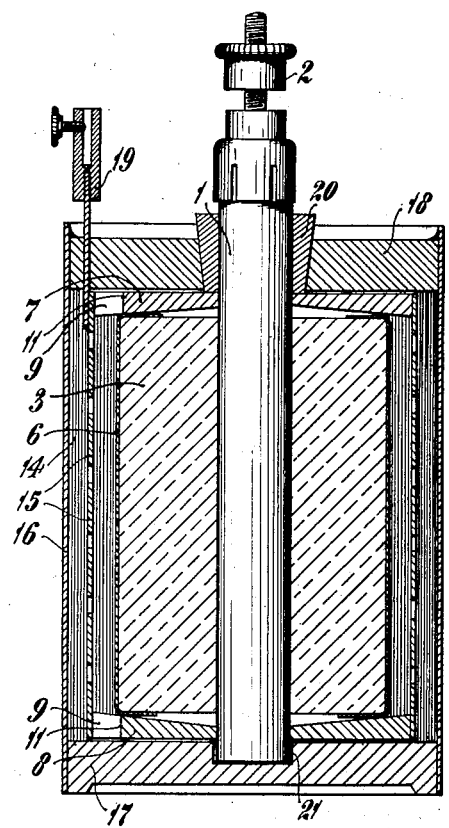
Fig. 6 shows in vertical section a cell according to the invention constructed as a dry cell.
Figure 7:
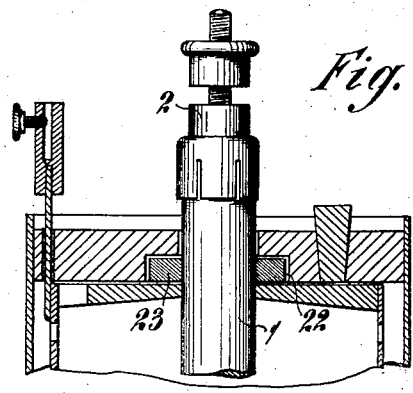
Fig. 7 represents in cross section a modification of the upper end plate in a dry cell.

Preferably the end plates 7 and 8 are somewhat arched at the side opposite the block, as illustrated by way of example in Figs. 6 and 7. This has the advantage that these end plates only bear on the peripheral edge of the block at the point where the strings exert force on said plates, so that the end plates cannot be subjected to bending and cannot break from this cause.

Figure 2:
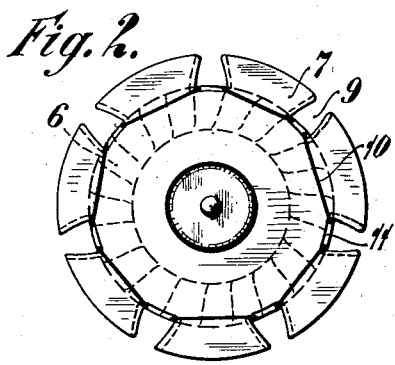
Fig. 2 is a plan view of the same.
Figure 4:
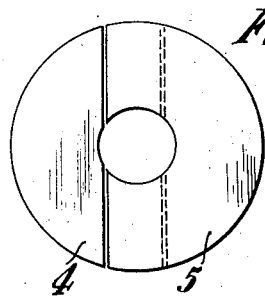

The end plates projecting beyond the cylinder periphery prevents said block from making contact with the wall of the jar or with any other article. The wrapper 6 is conveniently kept somewhat longer than the length of the block 3 so that it may embrace the ends of the block and be locked between the end plates and the cylinder, as illustrated in Figs. 2 and 6.

The great advantage presented by the electrode according to the invention is the absence of any danger of breakage of the carbon rod, the latter being further adapted for repeated use so that if the block ceases to work properly it may be renewed without necessitating the replacement of the carbon rod.

A very important advantage resides in the simplified method of assembling the parts and the small space occupied by the electrode during transport, due to the fact that the carbon rod and the block may be packed separately.

Figure 1:
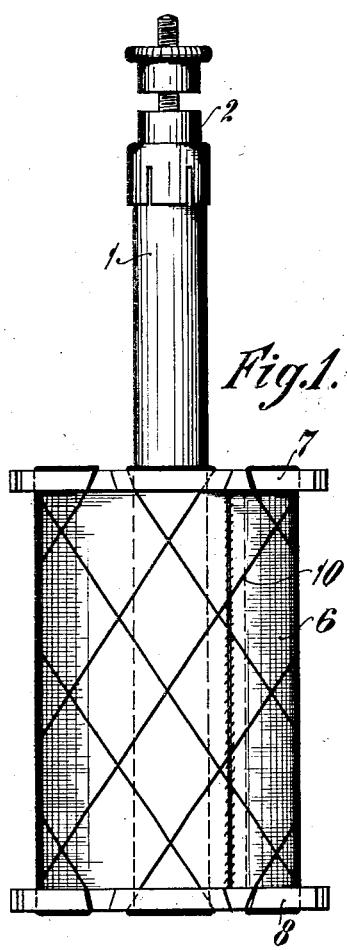
Figure 1 is an elevation of the electrode of a cell according to the invention.
Figure 5:
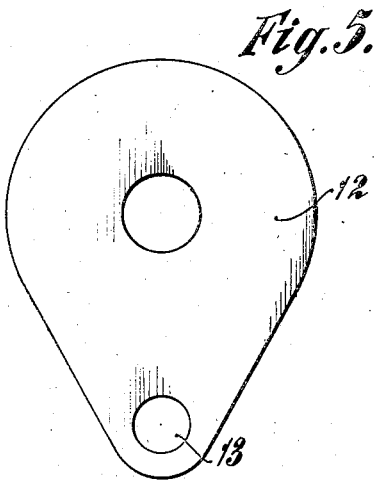
Fig. 5 illustrates a plate especially adapted for use in Leclanché cells to which the invention is applied.

A wet Leclanché cell constructed in accordance with the features of the present invention may further be provided with one or two plates of the shape as illustrated in Fig. 5. These plates 12 have a hole 13 for the zinc rod and in use are placed underneath and on top of the end plates 7 and 8 respectively. If required these plates may also serve as end plates 7 and 8 to which end they must be provided with recesses 9 for the strings.

A cell according to the invention, constructed as a dry cell, is illustrated in Fig. 6. This cell consists of an electrode entirely corresponding to that shown in Figs. 1 to 4. Like characters indicate like parts throughout the drawings. The electrode is surrounded by a thick layer of electrolyte 14 mixed with sawdust, gypsum or some other suitable material and is wrapped in a layer of paper, soaked with electrolyte. In this layer of electrolyte the zinc electrode 15, preferably in the shape of a perforated cylinder, is inserted. The whole is surrounded by a sleeve 16 of card-board or some other suitable material to which the bottom 17 and cover 18 are fixed in any appropriate manner. The plate 17 is imperforate, but the plate 18 is provided with one aperture for the rod 1 and another aperture for the terminal 19 of the zinc electrode 15. The plate 18 may further be provided with an opening for filling purposes, said opening normally being closed with a stopper as shown in Fig. 7. In the construction shown in Fig. 6 the aperture in the top plate 18 through which the carbon rod passes is made larger than the rod. The latter passes through a stopper 20, exactly fitting into the hole and closing the aperture. The opening closed by said stopper 20 also permits electrolyte to be poured into the cell. The stopper 20 has a tight fit around the carbon rod and keeps the latter in a central position at its upper end.

For fixing the carbon rod at its bottom end the lower plate 17 has a central recess 21 into which the carbon rod fits.

Instead of using a stopper in the top plate 18 said plate may be provided with a recess 22 (Fig. 7) filled up with a rubber or some other packing 23. In this case, however, a separate filling aperture should be added, as shown.

In contrast with the prior art the dry cell constructed in accordance with the present invention is simple inexpensive and very strong. During transport the carbon rod may be taken out and the cell is filled with electrolyte before being connected up. This electrolyte can be renewed and refilled. Owing to its shape and the substantial construction it may be fixed within sight to a wall by means of clamps or straps.

Having now described my invention, what I claim and desire to secure by Letters Patent is:—

1. In a galvanic cell, in combination, an electrode consisting of a carbon rod and a split depolarizing block having a bore therein for slidably receiving the rod, a wrapper enveloping the rod and the block, non-conducting strings for securing the wrapper to the block and the rod, and insulating end plates covering both ends of said block in order to hold the parts thereof together and to prevent longitudinal slipping of the same within the enveloping wrapper and strings.

2. A device as claimed in claim 1 wherein the arrangement is such that the parts of said split depolarizing block are wedge-shaped against one another so as to secure their electrical contact to the carbon rod by the pressure exercised by the end plates in connection with the wrapper and strings.

3. A device as claimed in claim 1 wherein the end plates are split so that only the peripheral edges thereof will bear against the corresponding edges of the block.

4. A device as claimed in claim 1 wherein the end plates are of a larger area than the sectional area of the block and are provided in their outer edges with equally spaced recesses for receiving the strings and making it possible for crossing the strings so that the strings will constitute a net-work surrounding said block.

5. A device as claimed in claim 1 wherein the end plates are of a larger area than the sectional area of the block and are provided in their outer edges with equally spaced recesses for receiving the strings and making it possible for crossing the strings so that the strings will constitute a net-work surrounding said block, the recesses being of sufficient depth so that the strings exert a binding action on the outer surface of the block.

In witness whereof I have hereunto set my hand.

CHRISTIAAN ANTONIE RUDOLF GRAAMANS.

Witnesses:
H. Y. KORY,
PLANTE FEBURL.